US005296863A

United States Patent [19]

Sezai

[11] Patent Number: 5,296,863

[45] Date of Patent: Mar. 22, 1994

[54] BEAM COMPRESSION PROCESS FOR ANTENNA PATTERN

[75] Inventor: Toshihiro Sezai, Tokyo, Japan

[73] Assignee: National Space Development Agency, Tokyo, Japan

[21] Appl. No.: 29,586

[22] Filed: Mar. 11, 1993

[30] Foreign Application Priority Data

Apr. 10, 1992 [JP] Japan ........ 4-116686

[51] Int. Cl.[5] ........ H01Q 3/22; G01S 3/16; G01S 5/02

[52] U.S. Cl. ........ 342/371; 342/382; 342/430

[58] Field of Search ........ 342/372, 371, 382, 430

[56] References Cited

U.S. PATENT DOCUMENTS 2,990,544 6/1961 La Rosa ........ 342/382

*Primary Examiner*—Gregory C. Issing

*Attorney, Agent, or Firm*—Armstrong, Westerman, Hattori, McLeland & Naughton

[57] ABSTRACT

A beam of a main antenna is scanned at a constant speed in the direction of compression of the beam width over the range of from (c−a) degree to (c+a) degree with an arbitrary angle c set as a reference angle, and a beam of a sub antenna is scanned by using a phase shifter at a constant speed in the direction of compression of the beam width over the range of from (c−b) degree to (c+b) degree where b represents an angle corresponding to the first zero point of a pattern of the sub antenna and larger than the ½ scan angle a of the main antenna. Received signals of both the antennas obtained by the beam scans are subjected to an in-phase multiplication process in a multiplying circuit for beam compression of the received pattern of the main antenna.

15 Claims, 6 Drawing Sheets

BEAM COMPRESSION PROCESS FOR ANTENNA PATTERN

BACKGROUND OF THE INVENTION

The present invention relates to a beam compression process for compressing a beam width of an antenna pattern of antennas.

Generally, a beam width is one of indices representing quality of antenna patterns of receiving antennas and so forth. The smaller the beam width, the higher is performance of the antenna pattern. However, the beam width and the size (length) of an antenna are inversely proportional to each other. Thus, a reduction in the beam width increases the antenna size, while a reduction in the antenna size increases the beam width.

In an attempt to double power of discriminating an object, i.e., resolution, in a radar antenna, for example, the beam width must be halved, which results in doubling of the antenna size. The doubled antenna size raises various drawbacks such as an increase in not only the area occupied by the antenna, but also weight of the antenna and dimensions of an antenna support structure. Conversely, if the antenna size is halved, the beam width is doubled and the discriminating power deteriorates down to a half level.

It is well known that the beam width and the antenna size are contradictory to each other as mentioned above. Since actual antennas are subjected to limitations in the area occupied by the antenna and other factors in most cases, a point of compromise is found in practical use at some extent of the beam width under such limitations.

For the purpose of improving the above problem, there has been conventionally known a beam compressing process using the principle of a multiplicative array that the beam width is reduced by multiplying received signals of a plurality of antennas by each other. FIG. 1 is a diagram showing an antenna arrangement for carrying out such beam compression. Denoted by reference numeral 101 is a main antenna constituted by, for example, an array antenna comprising a plurality of radiation elements arrayed into the rectilinear form with equal intervals, and 102 is a sub antenna. The sub antenna 102 is arranged at a position spaced from the main antenna 101 in the X direction, i.e., the direction where a beam width is to be compressed. 103 is a multiplying circuit for multiplying a received signal of the main antenna 101 by a received signal of the sub antenna 102. In the antenna device thus arranged, the signals received by the antennas 101, 102 are input in phase to the multiplying circuit 103 and subjected to a multiplication process. As a result, a directional characteristic of the main antenna and a directional characteristic of the sub antenna are multiplied to give a synthetic directional characteristic with the beam width compressed therein.

However, the above-explained conventional beam compression process for an antenna pattern has the problem that because the angle corresponding to the first zero point of the sub antenna pattern is about ½ of the angle corresponding to the first zero point of the main antenna pattern, the beam width of the main antenna is only compressed to about a half and cannot be compressed to less than a half.

SUMMARY OF THE INVENTION

The present invention has been made with a view of solving the above problem in the conventional beam compression process, and its object is to provide a beam compression process for an antenna pattern by which a beam width can be compressed to less than a half for an improvement in discriminating power.

To achieve the above object, the present invention compresses a beam width of an antenna pattern by the steps of providing an antenna system made up by a main antenna for receiving a radio wave and at least one sub antenna which is adjacent said main antenna in the direction where a beam width of said main antenna is to be compressed and which has a beam axis coincident with a beam axis of said main antenna; scanning a beam of said main antenna at a constant speed in said direction of compression of the beam width over the range of from (c−a) degree to (c+a) degree with an arbitrary angle c set as a reference angle, and scanning a beam of said sub antenna at a constant speed for the same period as the scan of said main antenna in said direction of compression of the beam width over the range of from (c−b) degree to (c+b) degree where b represents an angle corresponding to the first zero point of an antenna pattern of said sub antenna and larger than said angle a; repeating the beam scans of said main antenna and said sub antenna while shifting the reference angle c in units of 2a degree successively; and executing an inphase multiplication process of received signals of said main antenna and said sub antenna obtained by said beam scans.

In the above beam compression for the antenna pattern, assuming a case that the reference angle (c degree) is set to 0, the received signal obtained when the main antenna points in the direction of a degree is multiplied by the received signal of zero magnitude obtained when the sub antenna points in the direction of b degree, i.e., points to the first zero point of the sub antenna pattern. Therefore, a multiplied output of the antenna system becomes zero at the angle +a smaller than the angle b. Similarly, the output also becomes zero at the angle −a.

A particular case of the present beam compression process that the angle a and the angle b are equal to each other corresponds to the conventional beam compression process in which the output is made zero when the sub antenna points in the directions of ±b. In contrast, since the present invention is arranged such that the ½ scan angle a of the main antenna is set smaller than the ½ scan angle b of the sub antenna as mentioned above, the output becomes zero at angles smaller than ±b degree. Taking into account the assumption that the reference angle (c degree) is set to 0, the angular range in the direction of a main beam, defined by angles at each of which the output is zero, becomes narrower than that obtained by the conventional beam compression process, meaning that the beam width is compressed more than by the conventional process. Given the angle a being a half value of the angle b, for example, the beam width is further compressed to half of the compressed beam width obtained by the conventional process. Also, by setting the angle a to 1/n of the angle b, the beam width is compressed to 1/n of the compressed beam width obtained by the conventional process. With the present process, therefore, the beam width can be compressed to any desired value in theory.

EMBODIMENT

Figure 1:
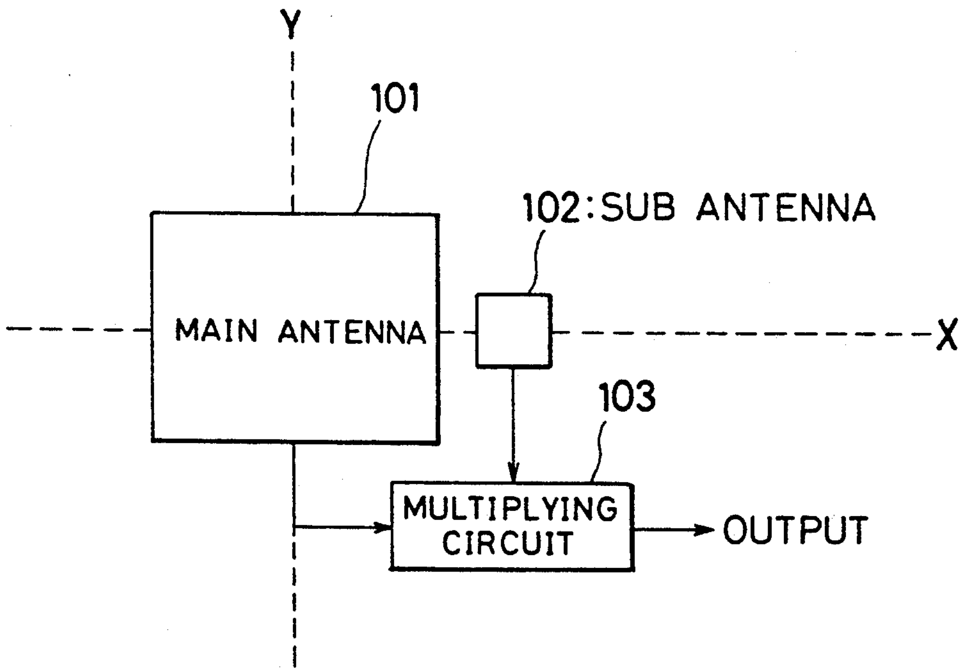
FIG.1 PRIOR ART
FIG. 1 is a conceptual diagram showing a conventional antenna device adapted for beam compression.
Figure 2:
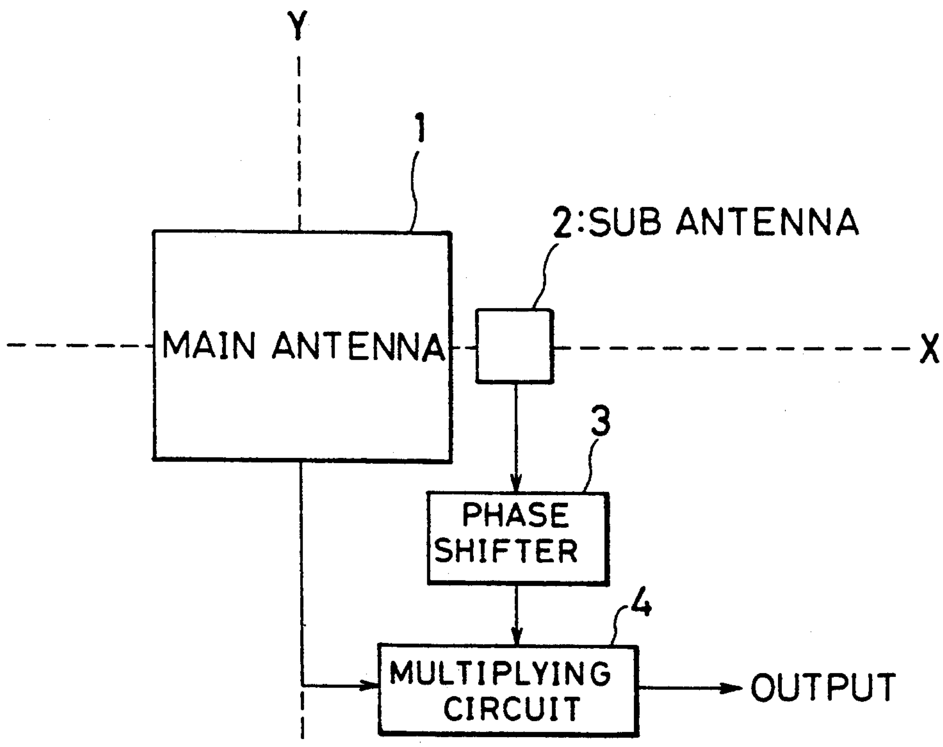
FIG. 2 is a conceptual diagram of an antenna device for explaining one embodiment of a beam compression process for an antenna pattern according to the present invention.

One embodiment will be described below. FIG. 2 is a conceptual diagram showing the schematic arrangement of an antenna device to explain an embodiment of a beam compression process for an antenna pattern according to the present invention. In FIG. 2, denoted by reference numeral 1 is a main antenna for receiving a radio wave which comprises a horn antenna, an array antenna or the like. 2 is a sub antenna which may be of any type antenna so long as it can scan a beam electronically. The sub antenna 2 is arranged adjacently to the main antenna 1 in the X direction, i.e., the direction where the beam width of a pattern of the main antenna 1 is to be compressed, and has a beam axis coincident with a beam axis of the main antenna 1. 3 is a phase shifter for scanning a beam of the sub antenna 2. 4 is a multiplying circuit for multiplying a received signal of the main antenna 1 by a received signal of the sub antenna 2.

In the antenna device thus arranged, a beam of the main antenna is scanned at a constant speed in the X direction over the range of from (c−a) degree to (c+a) degree with an arbitrary angle c set as a reference angle. For the same period as the scan of the main antenna, a beam of the sub antenna 2 is simultaneously scanned at a constant speed in the X-direction over the range of from (c−b) degree to (c+b) degree. Here, b represents an angle corresponding to the first zero point of an antenna pattern of the sub antenna 2 and a represents an angle smaller than the angle b. In the foregoing, accordingly, the scan speed of the beam of the sub antenna 2 is higher than the scan speed of the beam of the main antenna 1; namely, the scan speeds of both the beams are different from each other. To scan the beams of both the antennas at different speeds, any of the following four methods can be adopted.

With the first method, the main antenna 1 and the sub antenna 2 are both mounted on the same mechanical rotating member, such as a rotary table, to scan both the beams together over the range of from (c−a) degree to (c+a) degree, and the phase shifter 3 is operated to further scan the beam of the sub antenna 2 electronically so that the scan angle ranges from (c−b) degree to (c+b) degree. With the second method, the main antenna 1 and the sub antenna 2 are mounted on separate mechanical rotating members, such as rotary tables, to scan both the beams simultaneously over the range of from (c−a) degree to (c+a) degree, and the phase shifter 3 is operated to further scan the beam of the sub antenna 2 electronically so that the scan angle ranges from (c−b) degree to (c+b) degree.

Figure 3:
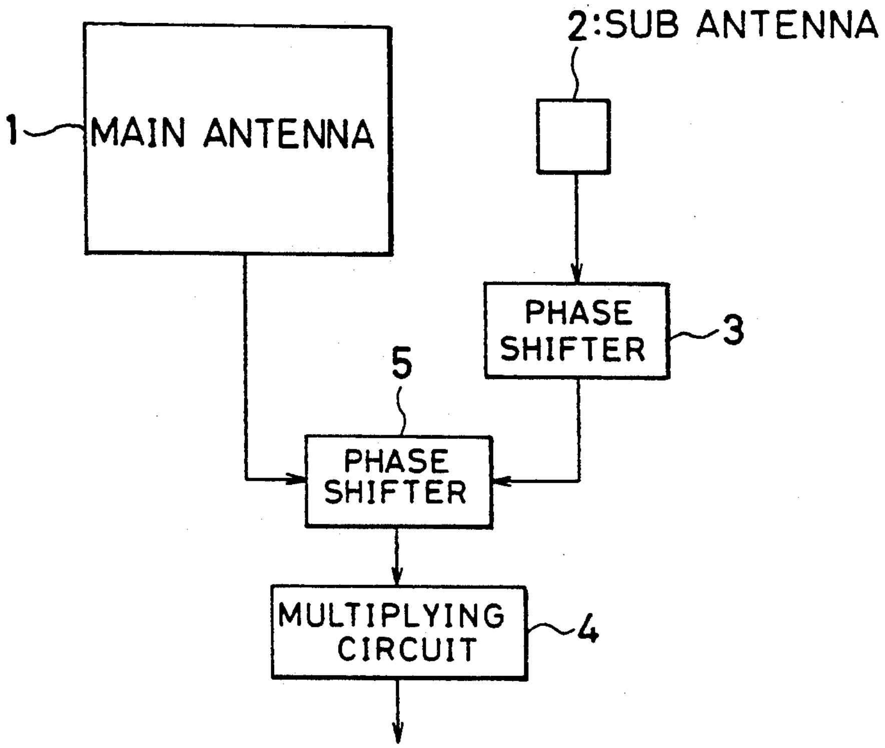
FIG. 3 is a block diagram showing another scan method for a main antenna and a sub antenna.
Figure 4:
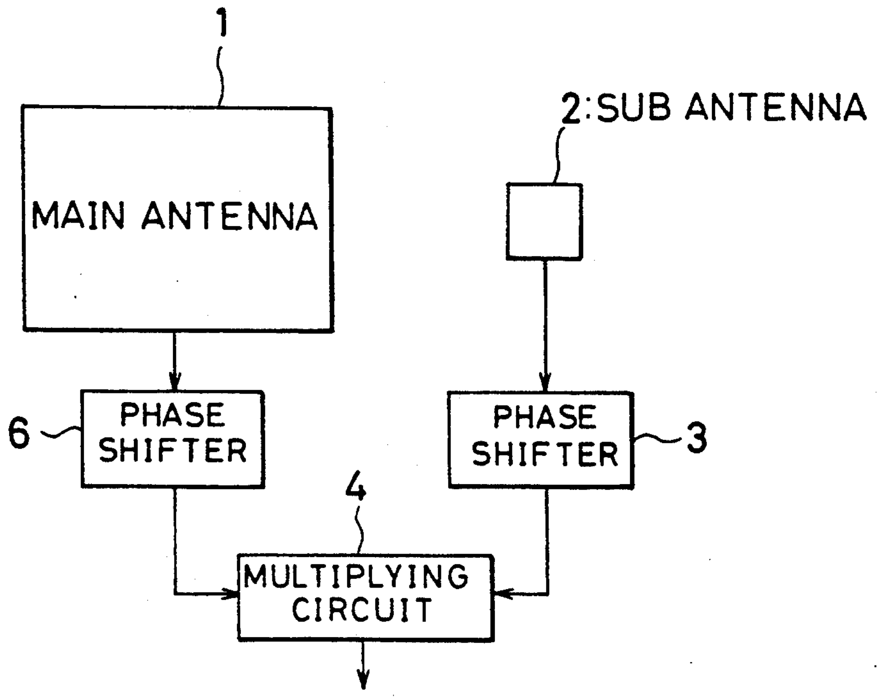
FIG. 4 is a block diagram showing still another scan method for the main antenna and the sub antenna.

With the third method, as shown in FIG. 3, both the beams of the main antenna 1 and the sub antenna 2 are electronically scanned together by the same phase shifter 5 over the range of from (c−a) degree to (c+a) degree, and the phase shifter 3 is operated to further scan the beam of the sub antenna 2 electronically so that the scan angle ranges from (c−b) degree to (c+b) degree. With the fourth method, as shown in FIG. 4, the beam of the main antenna 1 is electronically scanned by a phase shifter 6 over the range of from (c−a) degree to (c+a) degree and, at the same time, the beam of the sub antenna 2 is electronically scanned by the phase shifter 3 over the range of from (c−b) degree to (c+b) degree.

After scanning the beams of the main antenna 1 and the sub antenna 2 by any of the above methods for the reference angle c, the beam scans of the main antenna and the sub antenna are repeated in a like manner while shifting the reference angle c in units of 2a degree to (c+2a), (c+4a), . . . successively.

When a radio wave arrives during the period in which the beams are scanned as mentioned above, the main antenna 1 and the sub antenna 2 output received signals depending on the respective antenna patterns. These outputs are subjected to an in-phase multiplication process in the multiplying circuit 4. By obtaining an output of the multiplying circuit 4 as a final output, as explained in "Summary of the Invention" before, there can be provided an output corresponding to the pattern of the main antenna with its beam compressed based on the principle of a multiplicative array more than by the conventional process.

Figure 5:
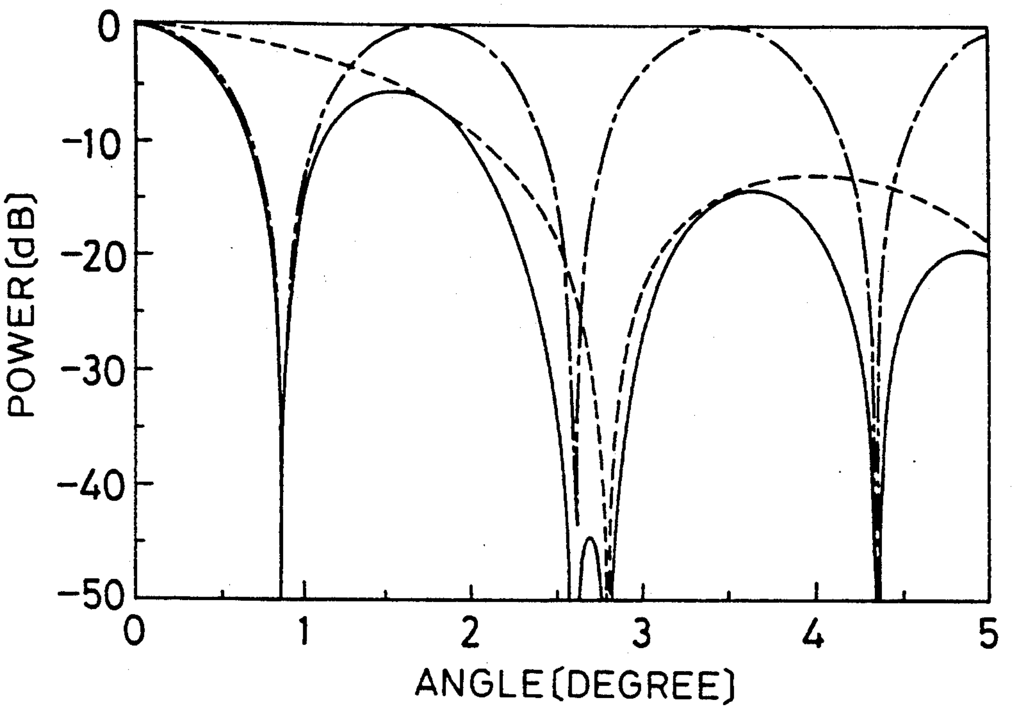
FIG. 5 is a graph showing a synthetic pattern obtained through a process of beam compression using the antenna device shown in FIG. 2.
Figure 6:
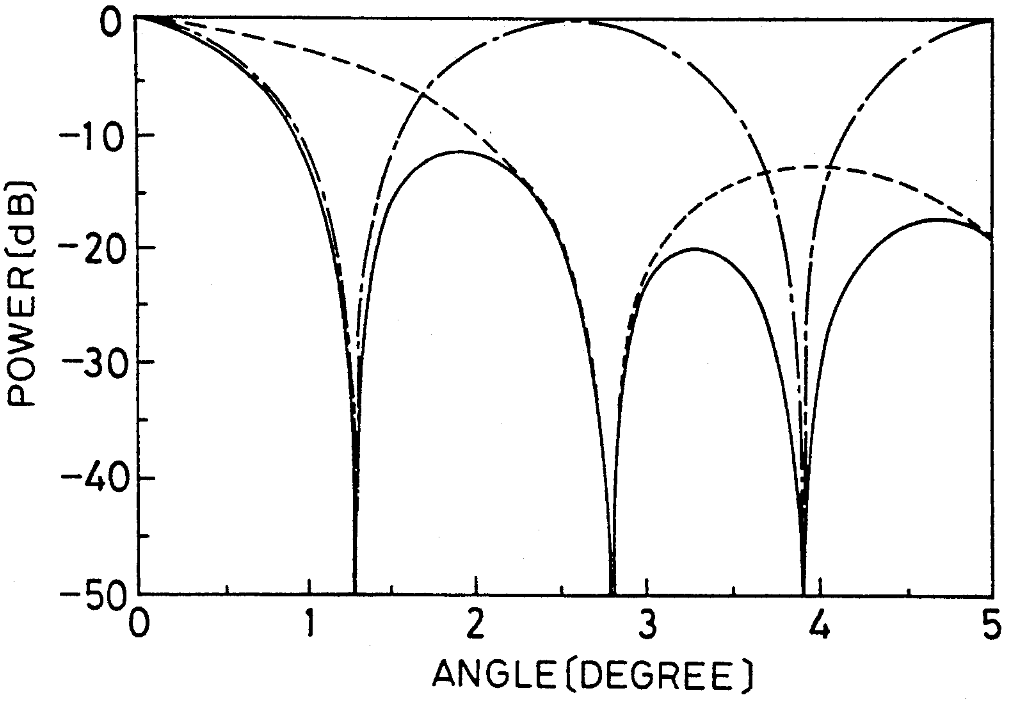
FIG. 6 PRIOR ART
FIG. 6 is a graph showing a synthetic pattern obtained by the conventional process for comparison with the pattern of FIG. 5.

FIG. 5 is a graph showing the simulation result of present beam compression obtained when the antenna system is made up by a main antenna comprising 20 array elements arrayed in the X direction with intervals of half-wavelength, each array element being in the form of a half-wave dipole antenna with a reflector (leaving a distance of $\frac{1}{4}$ wavelength therebetween) of which dipole axis is coincident with the Y direction, and a sub antenna comprising the same 3 array elements arrayed in the X direction with intervals of half-wavelength, the sub antenna being spaced half-wavelength from the main antenna, and the angle a is set to $\frac{2}{3}$ of the angle b. In the graph, solid lines represent a synthetic power pattern resulted after the process of beam compression, broken lines represent a power pattern obtained by only the main antenna, and one-dot-chain lines represent a power pattern obtained by only the sub antenna, respectively, in units of dB with the angle of 0 degree set as a reference. For comparison, FIG. 6 shows the simulation result of the conventional beam compression process in which the angle a is equal to the angle b. It will be found from the synthetic patterns shown in FIGS. 5 and 6 that the present beam compression process can compress the beam more than the conventional process can.

Figure 7:
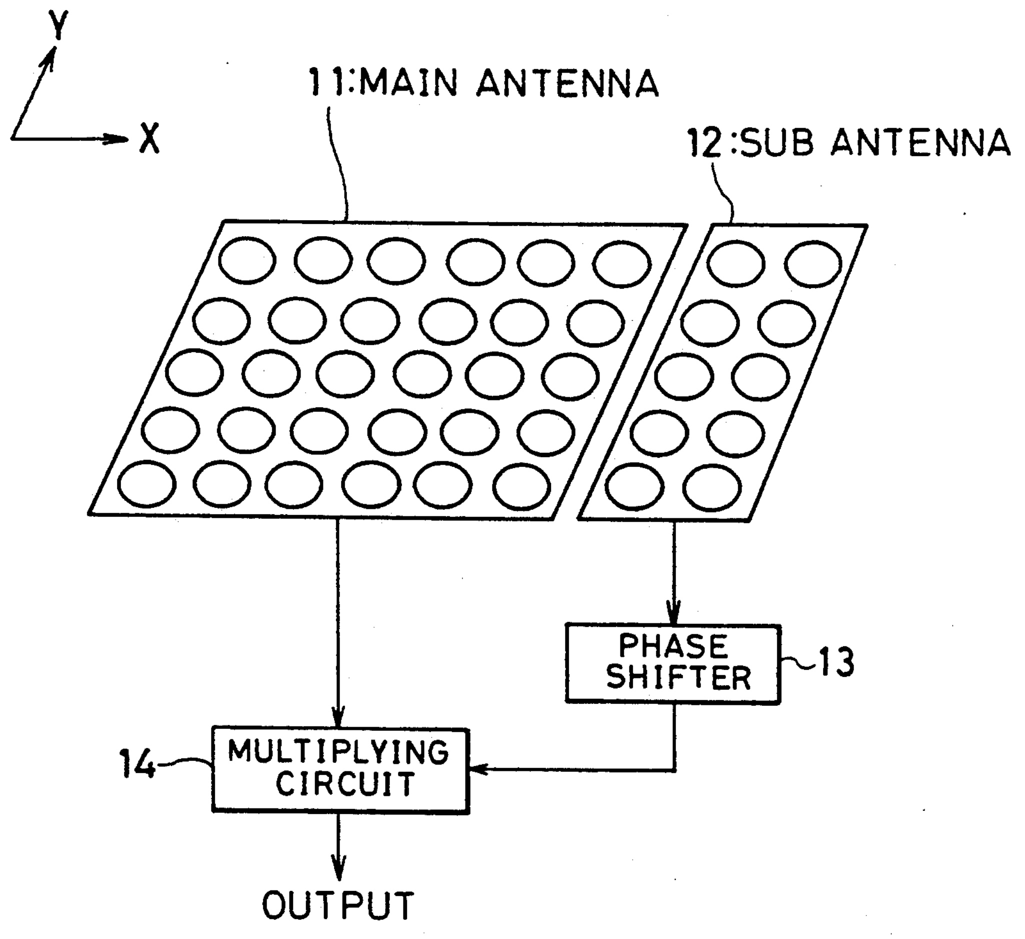
FIG. 7 is an illustration showing one example of the practical arrangement of an antenna system of the antenna device used for practicing the present invention.

Next, FIG. 7 shows one example of the practical arrangement of the antenna device for practicing the present invention. In this example, the antenna system is made up by using a circular patch array antenna as each of a main antenna 11 and a sub antenna 12. The sub antenna 12 is arranged at a position spaced from the main antenna 11 in the X direction.

Figure 8:
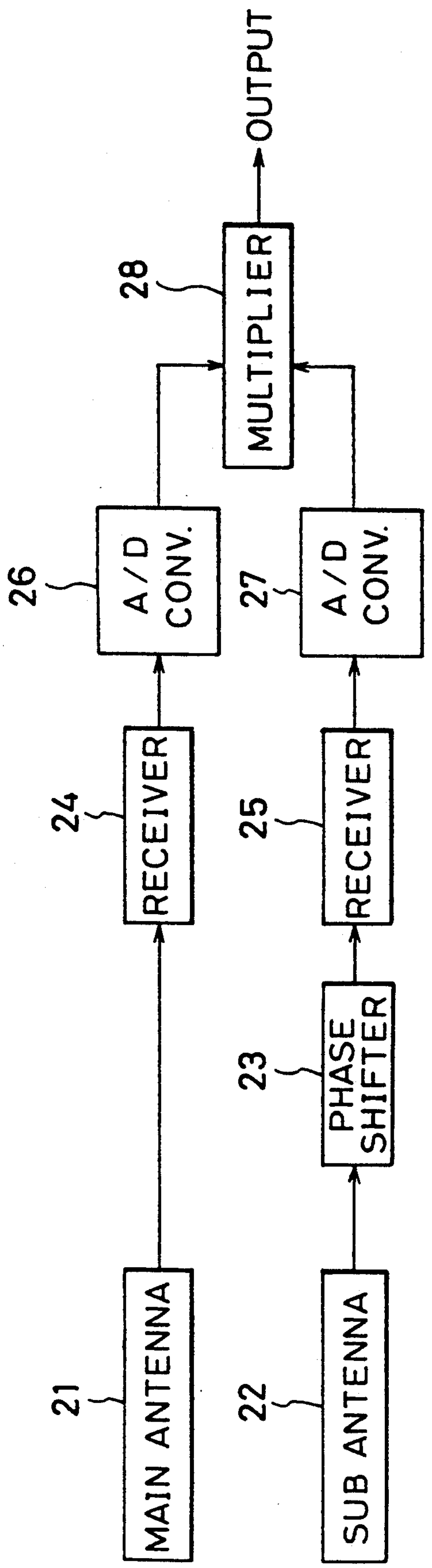
FIG. 8 is a block diagram showing one example of the practical arrangement of a multiplying circuit.

A phase shifter 13 can be formed of such means based on known techniques as controlling the phase by using a PIN diode or ferrite. A multiplying circuit 14 can be formed of any typical multiplying circuit or frequency modulation circuit when the multiplication process is executed in an analog manner. In the case of adopting a digital manner, the multiplying circuit 14 can be formed of such means based on known techniques as converting the received signals into digital signals by A/D converters and executing the multiplication process. One example of the latter case is shown in FIG. 8. Referring to FIG. 8, denoted by 21 is a main antenna, 22 is a sub antenna, 23 is a phase shifter, 24, 25 are receivers for receiving radio waves caught by the antennas 21, 22, respectively, 26, 27 are A/D converters for converting outputs of the receivers 24, 25 into digital signals, respectively, and 28 is a multiplier for multiplying outputs of the A/D converters 26, 27 by each other.

In the digital multiplying circuit thus arranged, the radio waves received by the main antenna 21 and the sub antenna 22 are input to the receivers 24, 25 which output respective powers of the received radio waves in the form of DC signals. These outputs of the receivers 24, 25 are applied to the A/D converters 26, 27 for conversion into digital values which are then multiplied by each other in the multiplier 28, followed by outputting a multiplied value.

While the conceptual diagram of FIG. 2, etc. are illustrated as using a single sub antenna, the sub antenna may be provided plural in number. Additionally, each of these sub antennas may be of any type antenna so long as it can scan a beam electronically. The multiplication process in the case of using plural sub antennas can be executed with any of two methods below. With the first method, outputs of the plural sub antennas are all added together and, thereafter, the resulting sum is multiplied by an output of the main antenna. In this case, the total received power of the sub antennas is increased, which results in a higher antenna gain and S/N ratio than using the single sub antenna. With the second method, outputs of the plural sub antennas are multiplied by an output of the main antenna successively. This method enables not only compression of the beam width, but also a reduction in the side lobe.

According to the present invention, as described above, since the $\frac{1}{2}$ scan angle of the sub antenna is set to the angle b which corresponds to the first zero point of the pattern of the sub antenna and is larger than the $\frac{1}{2}$ scan angle a of the main antenna, the angular range defined by angles at each of which the received output obtained through the multiplication process is zero, becomes narrower than that obtained by the conventional process. As a result, the beam width of the main antenna can be compressed more than by the conventional process to further improve the discriminating power.

What is claimed is:

1. A beam compression process for an antenna pattern comprising the steps of:

providing an antenna system made up of a main antenna for receiving a radio wave and at least one sub antenna which is adjacent said main antenna in the direction where a beam width of said main antenna is to be compressed and which has a beam axis coincident with a beam axis of said main antenna;

scanning a beam of said main antenna at a constant speed in said direction of compression of the beam width over a range of from (c−a) degree to (c+a) degree with an arbitrary angle c set as a reference angle, and scanning a beam of said sub antenna at a constant speed for the same period as the scan of said main antenna in said direction of compression of the beam width over a range of from (c−b) degree to (c+b) degree where b represents an angle corresponding to a first zero point of an antenna pattern of said sub antenna and larger than said angle a;

repeating the beam scans of said main antenna and said sub antenna while shifting the reference angle c in units of 2a degree successively; and executing an in-phase multiplication process of received signals of said main antenna and said sub antenna obtained by said beam scans.

2. A beam compression process for an antenna pattern according to claim 1, wherein said scanning step comprises the steps of mounting both said main antenna and said sub antenna on a same mechanical rotating member and scanning the beams of both said antennas together over the range of from (c−a) degree to (c+a) degree, and operating a phase shifter to further scan the beam of said sub antenna electronically so that the scan angle ranges from (c−b) degree to (c+b) degree.

3. A beam compression process for an antenna pattern according to claim 1, wherein said scanning step comprises the steps of mounting said main antenna and said sub antenna on separate mechanical rotating members and scanning the beams of both said antennas simultaneously over the range of from (c−a) degree to (c+a) degree, and operating a phase shifter to further scan the beam of said sub antenna electronically so that the scan angle ranges from (c−b) degree to (c+b) degree.

4. A beam compression process for an antenna pattern according to claim 1, wherein said scanning step comprises the steps of electronically scanning the beams of both said main antenna and said sub antenna together by a first phase shifter over the range of from (c−a) degree to (c+a) degree, and further electronically scanning the beam of said sub antenna by a second phase shifter so that the scan angle ranges from (c−b) degree to (c+b) degree.

5. A beam compression process for an antenna pattern according to claim 1, wherein said scanning step comprises the steps of electronically scanning the beam of said main antenna by a first phase shifter over the range of from (c−a) degree to (c+a) degree, and electronically scanning the beam of said sub antenna by a second phase shifter simultaneously with said electronic scan of said main antenna so that the scan angle ranges from (c−b) degree to (c+b) degree.

6. A beam compression process for an antenna pattern according to claim 1, wherein said step of providing said antenna system comprises providing said sub antenna plural in number, and said multiplication process step comprises the steps of adding the received signals of said sub antennas together, and multiplying the added total received signal of said sub antennas by the received signal of said main antenna.

7. A beam compression process for an antenna pattern according to claim 2, wherein said step of providing said antenna system comprises providing said sub antenna plural in number, and said multiplication process step comprises the steps of adding the received signals of said sub antennas together, and multiplying the added total received signal of said sub antennas by the received signal of said main antenna.

8. A beam compression process for an antenna pattern according to claim 3, wherein said step of providing said antenna system comprises providing said sub antenna plural in number, and said multiplication process step comprises the steps of adding the received signals of said sub antennas together, and multiplying the added total received signal of said sub antennas by the received signal of said main antenna.

9. A beam compression process for an antenna pattern according to claim 4, wherein said step of providing said antenna system comprises providing said sub antenna plural in number, and said multiplication process step comprises the steps of adding the received signals of said sub antennas together, and multiplying the added total received signal of said sub antennas by the received signal of said main antenna.

10. A beam compression process for an antenna pattern according to claim 5, wherein said step of providing said antenna system comprises providing said sub antenna plural in number, and said multiplication process step comprises the steps of adding the received signals of said sub antennas together, and multiplying the added total received signal of said sub antennas by the received signal of said main antenna.

11. A beam compression process for an antenna pattern according to claim 1, wherein said step of providing said antenna system comprises providing said sub antenna plural in number, and said multiplication process step comprises the step of multiplying the received signals of said sub antennas by the received signal of said main antenna successively.

12. A beam compression process for an antenna pattern according to claim 2, wherein said step of providing said antenna system comprises providing said sub antenna plural in number, and said multiplication process step comprises the step of multiplying the received signals of said sub antennas by the received signal of said main antenna successively.

13. A beam compression process for an antenna pattern according to claim 3, wherein said step of providing said antenna system comprises providing said sub antenna plural in number, and said multiplication process step comprises the step of multiplying the received signals of said sub antennas by the received signal of said main antenna successively.

14. A beam compression process for an antenna pattern according to claim 4, wherein said step of providing said antenna system comprises providing said sub antenna plural in number, and said multiplication process step comprises the step of multiplying the received signals of said sub antennas by the received signal of said main antenna successively.

15. A beam compression process for an antenna pattern according to claim 5, wherein said step of providing said antenna system comprises providing said sub antenna plural in number, and said multiplication process step comprises the step of multiplying the received signals of said sub antennas by the received signal of said main antenna successively.

* * * * *